R. LESSING.
EXTRACTION AND RECOVERY OF VAPOROUS AND GASEOUS CONSTITUENTS FROM COAL GAS.
APPLICATION FILED OCT. 8, 1915.
1,281,597.
Patented Oct. 15, 1918.
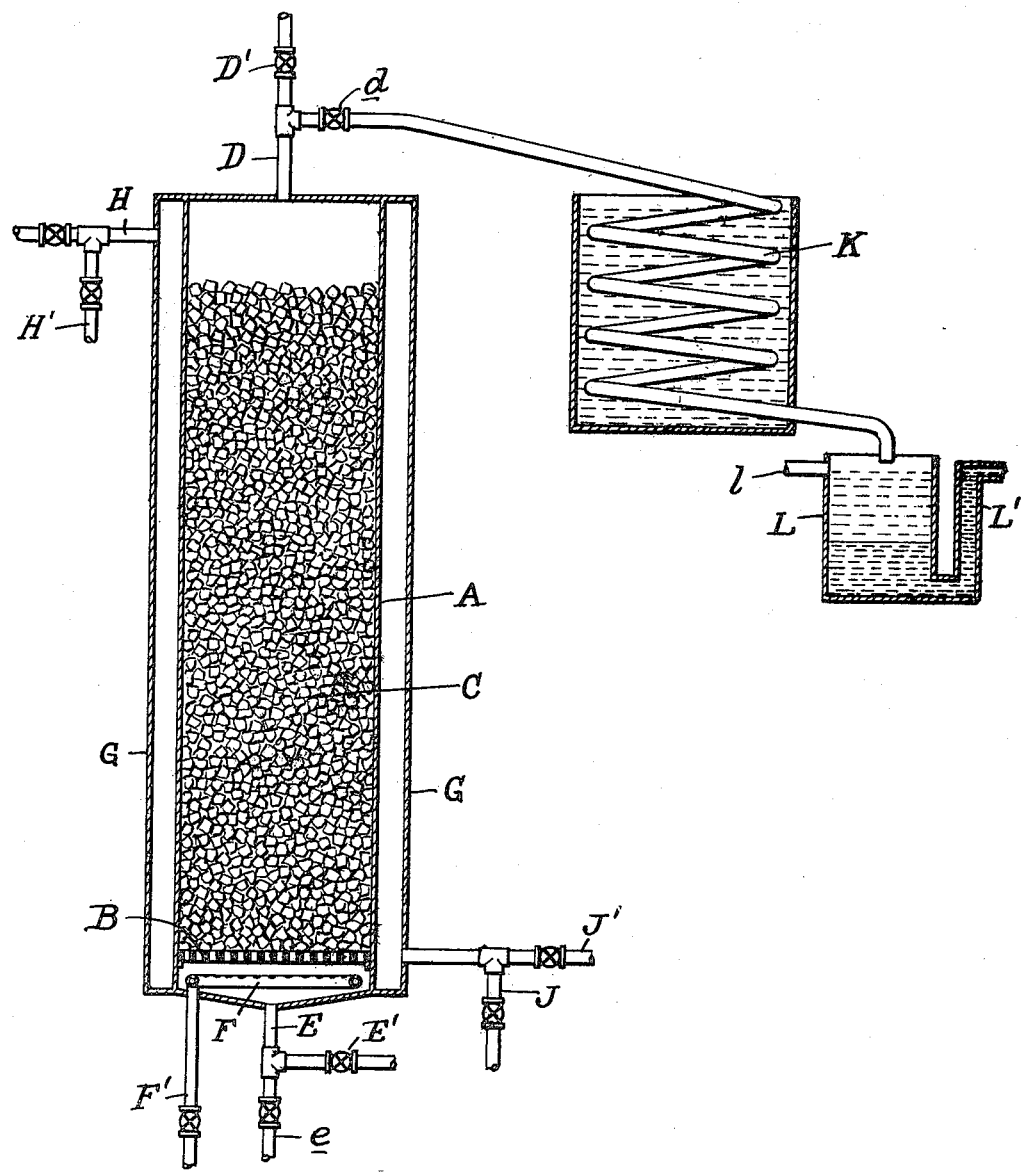

UNITED STATES PATENT OFFICE.

RUDOLF LESSING, OF HIGH HOLBORN, LONDON, ENGLAND.

EXTRACTION AND RECOVERY OF VAPOROUS AND GASEOUS CONSTITUENTS FROM COAL-GAS.

1,281,597.　　　　　　　Specification of Letters Patent.　　Patented Oct. 15, 1918.

Application filed October 8, 1915. Serial No. 54,910.

*To all whom it may concern:*

Be it known that I, RUDOLF LESSING, a subject of the King of Great Britain, residing in London, and whose post-office address is Southampton House, 317 High Holborn, London, W. C., England, have invented certain new and useful Improvements in the Extraction and Recovery of Vaporous and Gaseous Constituents from Coal-Gas, of which the following is a specification.

The removal of the vaporous constituents of coal gas, coke oven gas, carbureted water gas, blast furnace gas, and similar gases has hitherto been effected principally by washing or scrubbing the gas with tar, tar oils, petroleum oils and the like in stationary or mechanical scrubbers or washers of well-known types. For the recovery of the extracted products the whole bulk of the washing agent has been pumped to a distilling plant and heated to the distilling temperature of the extracted products.

I have found that the vaporous constituents of coal gas and similar gases such as benzol, toluol and their homologues, naphthalene and other hydrocarbons, carbon bisulfid and the like can be abstracted from the gas or gas mixture containing them by passing the gas at a suitable temperature over or through an absorbing agent for which the various vaporous constituents are good solvents and which agent may be suitably disposed upon some inert material which is placed in a gas tight vessel and which is not acted upon by the vaporous or other constitutents of the gas, in such a manner that the absorbing agent is substantially prevented from assuming its natural liquid level and may be regarded for the purpose of passing gas over or through it as of solid and rigid structure although in fact it may be in a liquid or semi-liquid state.

While in the known methods of washing or scrubbing gas with oils as for instance in the removal of benzol or naphthalene, the gas is caused to bubble through a body. or pass through a shower or spray of the washing liquid, in my process the absorbing agent is not moved at all but remains throughout in a substantially quiescent state both during the period of extraction from the gas and the following period of recovery of the extracted products.

I found that the absorbing agent can be substantially freed from the extracted substances and revivified *in situ* and that the extracted substances can be collected and recovered by shutting off the current of gas or diverting it to another absorbing vessel as soon as the absorbing agent has taken up a suitable amount of extractable substances from the gas, by distilling these off by the application of heat or with the aid of a current of steam, air or gas or by a combination of these methods and condensing and collecting the products together with water if steam is used, in a suitable condenser and receiving vessel.

The invention may be carried out in various ways of which the following may serve as an example, it being understood that I do not confine myself to the exact procedure described, which may be varied without departing from the invention.

Coal gas is passed through a closed vessel which is charged with broken or definite shapes of brick or coke or suitable porous inert materials (as charcoal, pumice, slag, or minerals, glass and stoneware) previously soaked in heavy tar oil, petroleum oil, pitch or bitumen from which all low-boiling constituents have been removed by distillation, or sulfur or other suitable substances. The vaporous substances with which the coal gas is more or less saturated and which are liquids at ordinary temperature when isolated are absorbed by the oil. When the oil has taken up the required amount of the substances to be extracted or at any suitable time which will vary according to the quantity and surface of the absorbing agent, the speed and volume of gas, the temperature and degree of its saturation with the required or other vaporous compounds, the mutual solubility of these and the absorbing agent and the vapor tension of the solution formed, the gas inlet and outlet valves to the absorbing vessel are closed and steam is blown through the vessel preferably by means of perforated pipes or coils in order to obtain good contact with all portions of the absorbing material. In some cases it will be advisable to have dry steam coils or a steam jacket provided, in order to assist or to bring about the distillation. The outlet may be placed at any suitable point of the vessel between the main gas valves, and is connected to a water cooled condenser in which both the volatile product and the steam are condensed. They are led to a receptacle preferably provided with a separator overflow so that the liquid hydrocarbon, sulfur compounds as carbon bisulfid, thiophene, thiotolene, etc., or other products are automatically separated from the condensed water. When the distillation is finished the steam or heat is shut off and the vessel and its contents are allowed to cool. The cooling may be hastened by the application of water in a suitable manner.

I have found that an effective way of cooling the material consists in passing gas or air through it, which will incidentally remove any condensed water. The material is then again ready for treating a further quantity of gas.

By employing three or four absorbing vessels they can be worked in rotation in a manner similar to that employed for working the purifier boxes in ordinary gas works practice.

The accompanying drawing illustrates diagrammatically a suitable form of apparatus for practising the invention. In the drawing, A designates a closed absorption vessel or tower having in its bottom portion a grate or grid B for sustaining the inert material C on or in which the absorbent is disposed, the latter being thereby substantially prevented from assuming its natural liquid level, and for the purposes of passing gas in contact therewith may be regarded as of solid or rigid structure although in fact it may be in a liquid or semi-liquid state. The filling C may be any of the inert materials to which reference has been made, or any other material suitable for the purpose.

The gas from which certain constituents are to be extracted and recovered is admitted to the upper portion of the tower at D, the flow being controlled by valve D', and the residue gas discharges through the bottom of the tower through outlet E, valved at E'. A downward continuation $e$ of outlet E may serve to drain the tower.

For releasing the constituents of the gas held by the absorbent, the gas inlet D and outlet E are closed by closing valves D' and E', and opening valved branch $d$, and heat is applied for the purpose of vaporizing and thereby freeing from the absorbent the recovered substances. The heat may be derived from steam admitted beneath grate or grid B from the perforated head F supplied from pipe F'. The heat thus derived may be augmented by steam jacket G surrounding tower A, or all of the heat may be derived from the jacket. The upper portion of the latter has the valved inlet H and the lower portion thereof the valved condensate outlet J. The jacket may also be utilized for cooling the tower and restoring it to normal condition following the release of the recovered constituents from the absorbent by circulating cold water upwardly therethrough, connection J having a water inlet J' for this purpose and connection H, a water outlet H'. The chamber and its contents may also be cooled by passing air or gas through it, thereby carrying off any condensed water.

The recovered constituents which are vaporized and thereby released from the absorbent are discharged through the valved branch $d$ of gas inlet D into and through the water-cooled condensing coil K, the condensate discharging into a suitable receiver L. The latter may be provided with an overflow outlet L' for the water, and another outlet $l$ for the recovered substances of lower specific gravity.

I wish it to be understood that the invention is not confined to the extraction of compounds by means of solution in a solvent, but it may also be applied to such chemical reagents which will combine with certain constituents of gas mixtures at ordinary temperature and will release these at a higher temperature or by steaming. For instance, the removal of carbon dioxid may be effected by using as the absorbing agent a porous material impregnated with sodium carbonate and by subsequently heating or steaming the sodium bi-carbonate formed whereby sodium carbonate is again obtained and the extracted carbon dioxid is liberated. The removal of naphthalene may be accomplished by impregnating the inert support-forming material with picric acid from which the naphthalene absorbed thereby may be removed in a current of superheated steam, the napthalene being finally separated by condensation, as will be understood.

What I claim is:—

1. In the extraction of vaporous or gaseous constituents from coal and other gases, the method herein described consisting in coating or impregnating inert supporting material with an absorbent with said material confined by a closed chamber, passing the gas to be treated in contact with the absorbent-supporting material and thereby causing the substances to be recovered to be retained by the absorbent, discontinuing the flow of gas, heating the supported absorbent *in situ* and thereby vaporizing the constituents absorbed from the gas, and discharging such vapor-constituents from the chamber.

2. In the extraction of vaporous or gaseous constituents from coal and other gases, the method herein described consisting in coating or impregnating inert material with a liquid absorbent having a higher boiling point than the gas constituents to be absorbed with said material inclosed by a chamber, passing coal gas through the chamber and in contact with said material, discontinuing the flow of gas and heating said material and absorbent sufficiently to vaporize and thereby release the absorbed gas constituents but insufficiently to either remove or change the character of the absorbent, whereby the latter is adapted for reuse without change of position.

3. In the extraction of vaporous or gaseous constituents from coal and other gases, the method herein described consisting in coating or impregnating inert material with a hydrocarbon absorbent from which has been removed the constituents which boil at as high temperatures as the constituents to be removed from the gas, confining said material within a closed chamber, passing the gas to be treated in contact with the absorbent-supporting material and thereby causing the gas constituents to be recovered to be retained by the absorbent, discontinuing the flow of gas, and heating the supported absorbent *in situ* and thereby vaporizing the constituents absorbed from the gas and discharging such vapor constituents from the chamber.

4. In the recovery of constituents from gas mixtures, the method which consists in passing the gas mixture in contact with a confined or inclosed mass of pieces of inert material carrying material that will take up said constituents from the gas as it passes in contact with said mass of pieces, and then separating said constituents from said mass *in situ*, substantially as described.

5. The method of extracting constituents from gaseous mixtures which consists in passing the gaseous mixture over or through an agent which is an absorbent or a re-agent for said constituents and which is carried by and distributed through an inclosed mass of inert material, and then separating said constituents from said agent *in situ* by the application of heat, steam, gas, air, or reduced pressure, substantially as described.

6. In the recovery of constituents from gas mixtures, the method which consists in passing the gas mixture through an inclosed mass of pieces of inert material carrying a material which will take up the desired gas constituents and then separating the said constituents *in situ*, substantially as described.

In testimony whereof I have signed my name to this specification in the presence of two subscribing witnesses.

RUDOLF LESSING.

Witnesses:
J. PHILLIPS CRAWLEY,
W. J. SHERBEN.